INVENTOR.
LAWRENCE J. BRASHER
BY
WILSON, SETTLE & CRAIG
ATTORNEYS

May 11, 1965   L. J. BRASHER   3,182,605
VEHICLE CONTROL
Filed Oct. 7, 1963   5 Sheets-Sheet 4
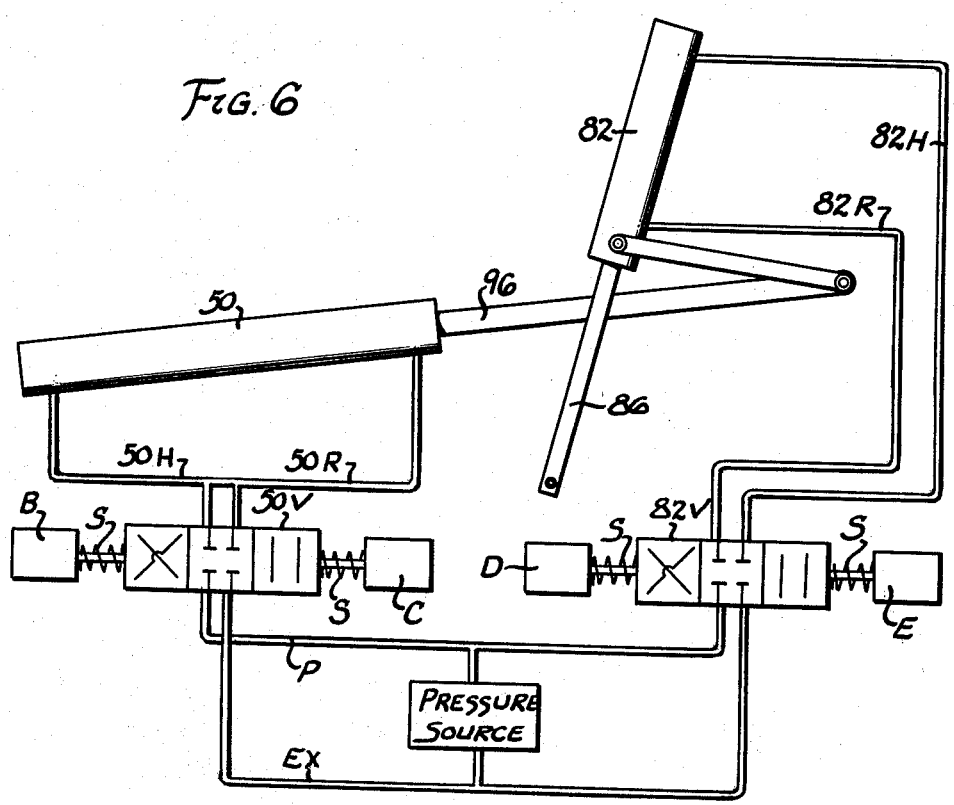
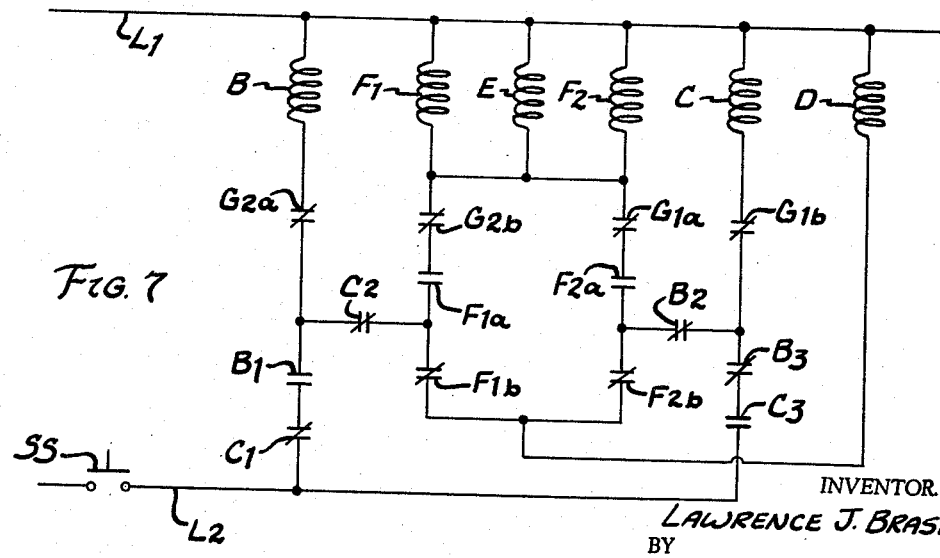
INVENTOR.
LAWRENCE J. BRASHER
BY
WILSON, SETTLE & CRAIG
ATTORNEYS May 11, 1965

L. J. BRASHER 3,182,605

VEHICLE CONTROL

Filed Oct. 7, 1963

INVENTOR.
LAWRENCE J. BRASHER
BY
WILSON, SETTLE & CRAIG
ATTORNEYS

United States Patent Office 3,182,605
Patented May 11, 1965

3,182,605
VEHICLE CONTROL
Lawrence J. Brasher, 18671 Lancashire Road,
Detroit, Mich.
Filed Oct. 7, 1963, Ser. No. 314,150
10 Claims. (Cl. 105—342)

This invention relates to the control of vehicles, and more particularly to the control of large self-propelled vehicles where the field of vision of the vehicle operator from his normal position in the vehicle is not sufficient to cover all possible situations encountered during normal operation of the vehicle.

One example of a vehicle to which the present invention is readily adapted is that of a railway locomotive. Historically, railway locomotive cabs have been operated by two men, the engineer and the fireman. In the days when locomotives were fired by coal, the fireman's primary duty was that of maintaining the fire. With the advent of electric and diesel powered locomotives, the fireman's duties have dwindled to the point where the fireman functions primarily as a lookout for the engineer on the opposite or left hand side of the locomotive. Present practice is to provide an auxiliary set of controls on the fireman's side of the cab, because it is frequently necessary to control the locomotive from this side, especially when backing, coupling or uncoupling cars in switch yards where the rear of the train curves away from the engineer's side.

Similar problems are frequently encountered in other relatively large vehicles where the bulk of the vehicle is such that it is simply impossible for the operator to have direct vision to all points of interest to him during operation of the vehicle. Typical examples of this type are ships, large earth moving vehicles, and semi and full trailer trucks.

It is a primary object of the invention to provide an operator's control station for large vehicles or the like wherein the operator, together with all vehicle controls, may be shifted from point to point upon the vehicle to obtain the desired field of visibility.

It is another object of the invention to provide a mobile machine control console for large vehicles or the like wherein the vehicle operator is supported in the same relationship to the vehicle controls throughout a full range of movement of the control console and operator's support relative to the vehicle frame.

Still another object of the invention is to provide a mobile operator's control console for large vehicles or the like which can be moved at the will of the operator to selected vantage points wherein complete control over the vehicle exists during movement of the console thereon.

Other objects and features of the invention will become apparent by reference to the following specification and to the drawings.

In the drawings:

FIGURE 5 is a detail view, partially in section, of a limit switch actuator;

FIGURE 6 is a schematic diagram of a hydraulic control circuit;

FIGURE 7 is a schematic diagram of an electrical control circuit; and

Figure 1:
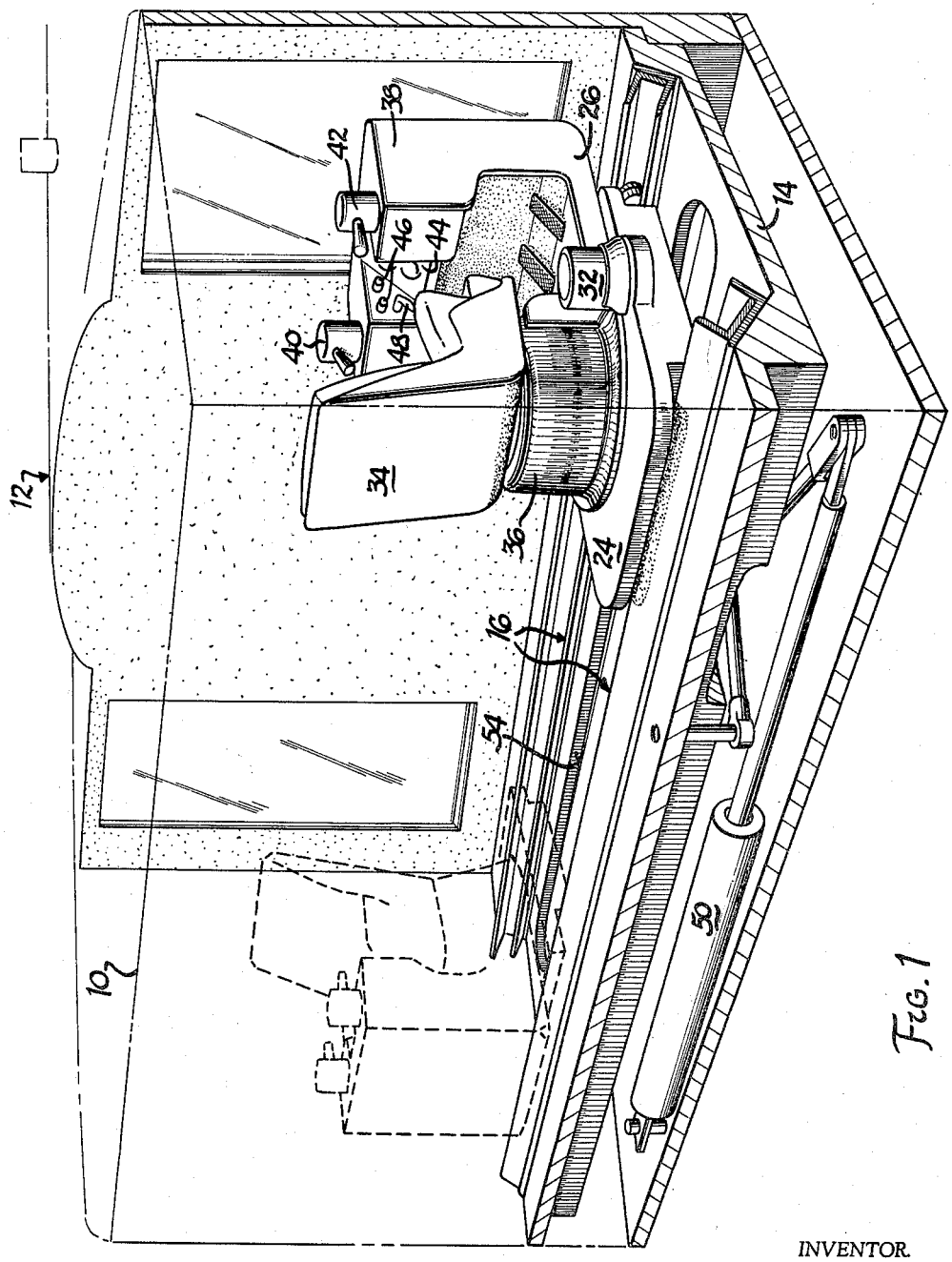
FIGURE 1 is a perspective view, partially in section, showing one form of the invention in the environment of a railway locomotive cab, portions of the locomotive and cab being indicated in broken lines.

Referring first to FIGURE 1, there is indicated in broken line the outline of a cab 10 of a railway locomotive designated generally 12. A portion of the locomotive frame 14 is constructed with a pair of horizontal tracks designated generally 16 which extend transversely across cab 10 from one side of the locomotive to the other. As best seen in the cross sectional view of FIGURE 3, each of tracks 16 is constructed from two elongate angle members 18 and 20 respectively which confine a series of bevelled wheels 22 rotatably mounted on opposite sides of a carriage 24. Preferably, three wheels are mounted on each side of the carriage, the two end wheels resting upon angle member 18 and the lower arm of angle member 20 while the central wheel of the group of three is elevated so that it bears against the lower surface of the upper arm of angle 20. This arrangement confines carriage 24 against vertical play in the track assembly.

An operator supporting platform 26 is mounted upon carriage 24 for rotation about a vertical axis, as by a thrust bearing assembly 28. A ring gear 30 is fixedly mounted upon the lower side of platform 26 and is meshed with a pinion (not shown) driven by an electric motor 32 (FIG. 1) to rotate platform 26 upon carriage 24.

An operator's seat 34 is supported upon a pedestal 36 fixedly mounted upon platform 26, pedetsal 36 extending generally coaxially of the axis of rotation of platform 26. Platform 26 projects forwardly beyond one side of carriage 24 and a control console 38 is fixedly mounted on the forward end of the platform.

The various control levers, switches and pedals for operating the locomotive are mounted upon control console 38, as are the various gauges. It will be appreciated that the controls and gauges employed will differ in accordance with the particular type of locomotive and will be of standard, approved types. Therefore, the locomotive controls and gauges have not been illustrated in detail, although the throttle and brake control have been illustrated at 40 and 42 respectively, while the various gauge dials and switches will, in the usual case, be located in a central panel 44.

In addition to the locomotive operating controls, controls for operating the platform rotating motor 32 and a hydraulic traversing mechanism for carriage 24 are also located on console 38. The controls for motor 32 may take the form of a pair of switch buttons 46, one button being provided for each direction of rotation of motor 32 and electrically connected to the motor in a fashion such that the motor will drive in one direction as long as the appropriate button is held depressed. A traversing control handle 48 is carried on console 38 to control the flow of hydraulic fluid to a hydraulic motor 50 which actuates a linkage to be described below to position carriage 24 at either side of the locomotive.

Figure 2:
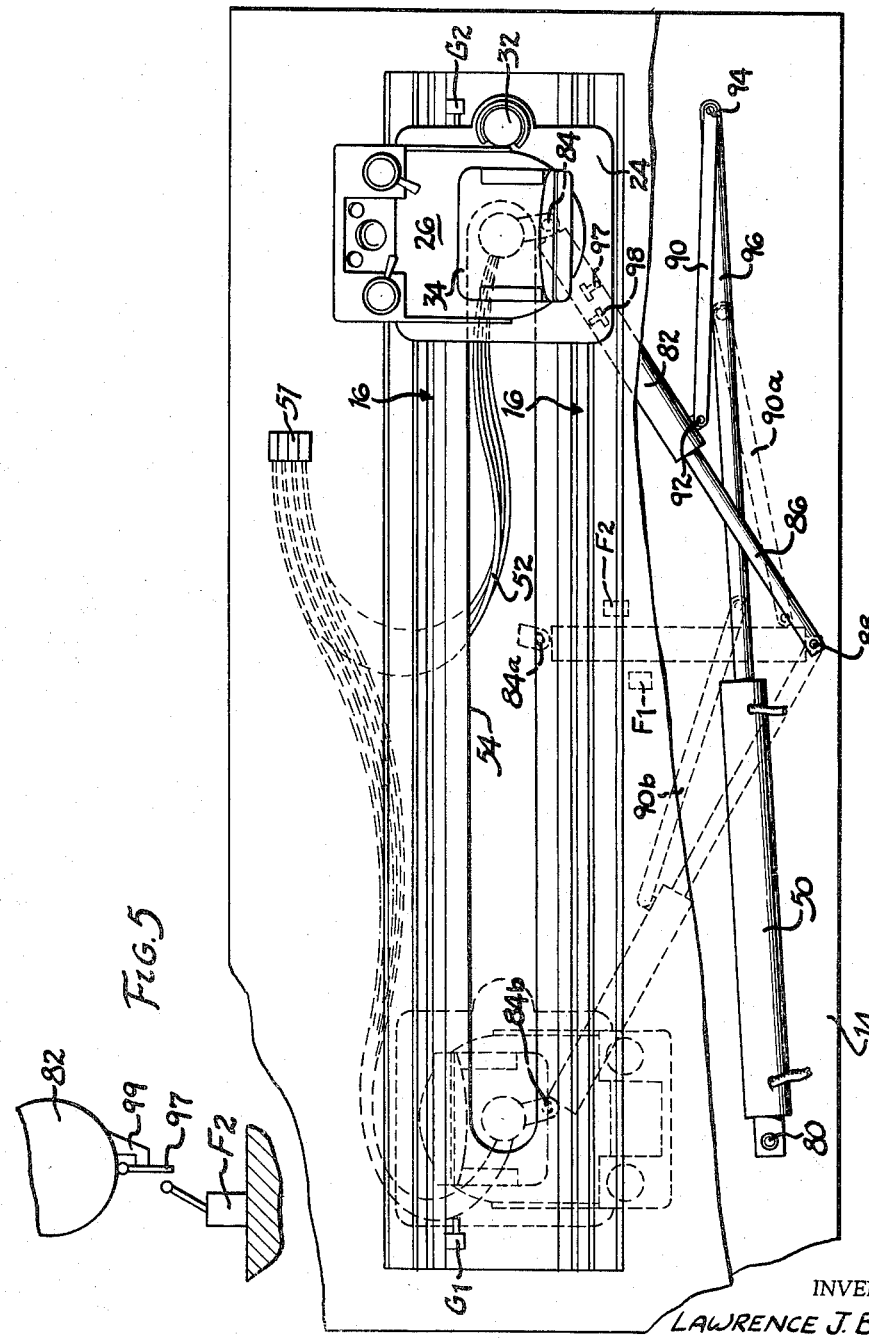
FIGURE 2 is a top plan view of the control station of FIGURE 1, with certain parts broken away or omitted.

The various controls on console 38 are connected to the devices which they control by electric cable or pneumatic or hydraulic lines as the case may be. Because the various controls are mounted upon console 38 which is in turn rotatably supported upon the carriage 24 which is movable transversely of the locomotive, the various cables and conduits must be connected from a stationary point such as 51 (FIG. 2) on the locomotive frame to the controls in a manner which accommodates the necessary movement. The various cables and conduits indicated as a unit generally at 52 in FIGURE 2 are connected from point 51 to the console by flexible sections which pass upwardly through an elongate slot 54 in frame 14 which extends centrally below the carriage and is of a length sufficient to accommodate movement of the carriage attached ends of the cables and conduits throughout the full traversal of carriage 24.

Preferably, roll up screens (not shown) of metal slats are connected to both sides of carriage 24 to cover slot 54, a spring biased roll of slats being located at each end to extend as the carriage moves away from the end.

In the form of FIGURES 1–4, the electric cables 56 pass upwardly through a central tube 58 which is fixedly mounted upon carriage 24 and does not rotate with platform 26. The axis of tube 58 is coaxial with the axis of rotation of platform 26 and since the maximum rotation of the platform is limited to an arc of 180°, the upper ends of the cables are simply led out of pedestal 36 as at 56a (FIG. 3) and connected to the appropriate gauges or switches on console 38. An appropriate amount of slack in cables 56, combined with the limited rotation of platform 26 permits the cables to twist gently within tube 58 during rotation of platform 26.

The pneumatic or hydraulic conduits 60 are connected from point 51 to a housing 62 which is fixedly mounted upon carriage 24. For the sake of clarity, only a single conduit 60 has been illustrated in FIGURE 3, however, in the usual case, several such conduits will be connected to housing 62 at various points on the housing. The illustrated conduit 60 is connected to a fitting 64 on housing 62 and an internal passage within the housing connects fitting 64 to a corresponding fitting such as 66 on the upper side of housing 62. A flexible conduit 68 connects fitting 66 to another fitting 70 located upon a second housing 72 which is rotatable with platform 26 and is supported upon cable tube 58 for vertical sliding movement on the tube. Like housing 62, housing 72 is formed with an internal passage which connects fitting 70 to still another fitting 74 from which a conduit 76 extends and is led to the appropriate control on console 38.

Figure 3:
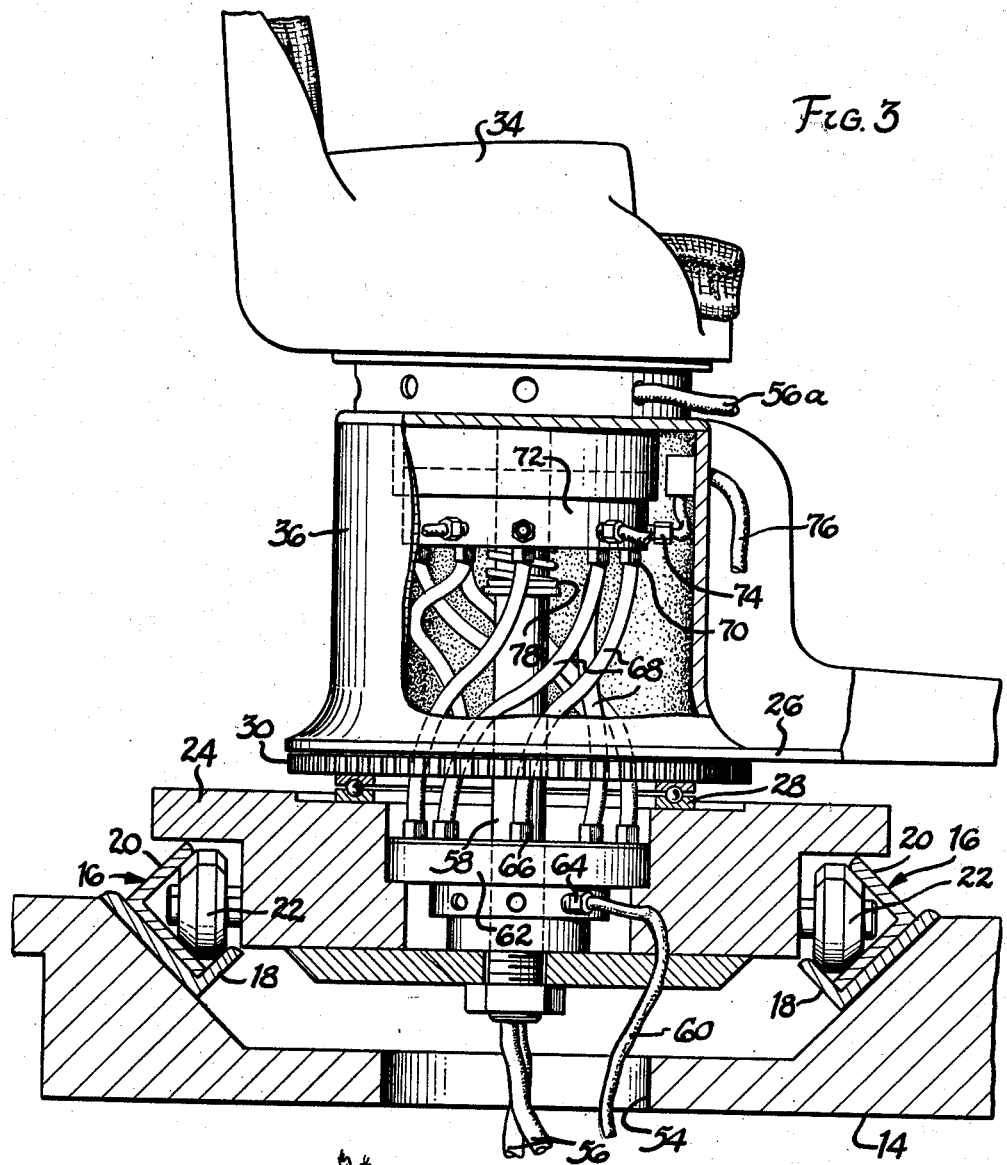
FIGURE 3 is a detailed side elevation view, partially in cross section, with certain parts broken away showing details of the console supporting carriage and platform of the structure of FIGURE 1.
Figure 4:
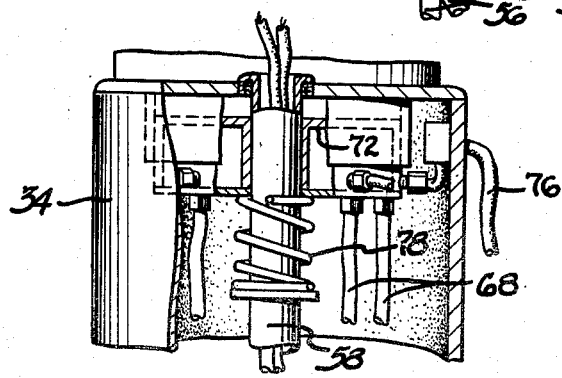
FIGURE 4 is a detailed view, partially in section, of a portion of the structure in FIGURE 3 in a different position than that disclosed in FIGURE 3.

As best seen in FIGURE 3, the flexible conduits 68 which are connected between housing 62 and 72 do not pass directly vertically from fitting 66 to fitting 70. In the normal case, fitting 70 is displaced approximately 90° about the axis of rotation of platform 26 from its corresponding fitting 66, and the length of conduit 68 is such that the conduit is loosely flexed in this condition and is not under tension. A light coil spring 78 supports housing 72 from beneath. Spring 78 is a relatively light spring which does little more than balance the weight of housing 72 to support the housing while at the same time applying little or no tension to conduit 68. When platform 26 is rotated upon carriage 24, the distance between fittings 66 and 70 decreases as conduit 70 is rotated about the axis of platform 26 toward vertical alignment with fitting 66. As this action occurs, conduits 68 straighten out and housing 72 rises on tube 58, as shown in FIGURE 4, this action helping prevent kinking or undue flexing of the conduits as the platform is rotated.

In the environment of a railway locomotive, carriage 24 is normally located at the right hand side of cab 10, with the operator's seat 34 facing forwardly in the full line position shown in FIGURE 2. Rotation of platform 26 upon carriage 24 is limited to an arc of 180° in a clockwise direction from the position shown in FIGURE 2, this arc of rotation enabling the engineer to rotate platform 26 while being able to observe through the right side window of the cab while platform 26 is rotating between its forwardly facing and rearwardly facing positions.

Referring briefly to FIGURE 3, it will be noted that fitting 70 is displaced 90° forwardly from fitting 66 when the platform is in its forwardly facing position and thus will be displaced 90° rearwardly from fitting 66 when the platform is in a rearwardly facing direction. Thus, conduits 68 are never displaced more than 90° from a normal upright or direct alignment connection between fittings 66 and 70.

The mechanism for positioning carriage 24 at either end of tracks 16 is most clearly shown in FIGURE 2. A first hydraulic motor 50 is pivotally mounted at one end upon frame 14 as by pivot 80. A second hydraulic motor 82 has its cylinder pivotally mounted on carriage 24 as at 84 and the piston rod 86 of motor 82 is connected to a fixed pivot 88 on frame 14 at the longitudinal centerline of the locomotive. A rigid non-extensible link 90 is pivotally connected at 92 to the cylinder of motor 82 and at its other end is connected by a pivot 94 to the end of the piston rod 96 of motor 50. Motors 50 and 82 with their piston rods function as rigid extensible links.

To traverse carriage 24 from the full line position of FIGURES 2, motors 50 and 82 are simultaneously actuated by the electrical and hydraulic control circuits to be described below to retract their piston rods. The retraction of piston rod 86 into its cylinder draws carriage 24 to the left, and this action is assisted by the retraction of piston rod 96 which, through link 90, drives motor 82 and its piston rod 86 in a counterclockwise direction about pivot 88. When carriage 24 reaches the midpoint of its travel along track 16, the piston rod 86 of motor 82 is fully retracted and the pivotal connection 84 between motor 82 and carriage 24 is at the position indicated at 84a of FIGURE 2. At this time, piston rod 96 of motor 50 has completed approximately one-half of its retracting stroke and link 90 is located in the position indicated at 90a of FIGURE 2.

At this point, the hydraulic connections to motor 82 are automatically reversed so that motor 82 begins to drive piston rod 86 in a direction extending the piston rod from the cylinder. Motor 50 continues to retract its piston rod 96 and the combined action of the two motors continues to drive carriage 24 to its extreme left hand position. When carriage 24 arrives in its extreme left position, piston rod 86 of motor 82 is again fully extended, while the piston rod of motor 50 is almost fully retracted, link 90 now assuming the position indicated at 90b of FIGURE 2.

The particular arrangement of hydraulic motors and links shown in FIGURE 2 is advantageous because the geometry of the motor and linkage system is such that a very positive holding action is applied to maintain the carriage in either of its end limits of travel on tracks 16. It will be appreciated that other mechanisms could be employed to drive carriage 24 in its traversing movement, such as a rack and pinion, but the particular drive shown has been found to combine the advantage of power with a practical speed of movement together with a substantially positive holding force at the extreme end positions. Further, the drive shown achieves a relatively long range of travel of carriage 24 without requiring a corresponding length of stroke from either motor 50 or motor 82.

Schematic diagrams of the hydraulic and electrical control circuits which control operation of motors 50 and 82 appear in FIGURES 6 and 7. Referring first to FIGURE 6, each of motors 50 and 82 is hydraulically connected to a three-position solenoid actuated four-way reversing valve, the valve connected to motor 50 being designated 50V and the valve for motor 82 being designated 82V. Valve 50V is provided with four ports, one connected to a high pressure conduit P and a second connected to an exhaust or low pressure conduit EX, conduits P and EX being connected to the outlet and intake respectively of a schematically illustrated source of hydraulic pressure. The remaining two ports of valve 50V are connected to the head end and rod end respectively of motor 50, conduit 50H being connected to the head end and 50R being connected to the rod end.

Valve 50V has three positions and is normally maintained in its neutral or center position by centering springs S, in which position all of the conduits connected to the valve are blocked within the valve. The valve may be shifted from its neutral position upon the energization of either of two solenoids B or C. Upon energization of solenoid B, the valve spool is shifted to the left as viewed in FIGURE 6 to connect pressure conduit P to head end conduit 50H while simultaneously connecting rod end conduit 50R to exhaust conduit EX. Energization of solenoid C places the cross connections in operative alignment with the conduits, connecting pressure line P to rod end conduit 50R while connecting head end conduit 50H to exhaust conduit EX.

Valve 82V is identical in structure and function to valve 50V. Energization of solenoid D aligns the direct connections with the valve ports to connect pressure line P to rod end conduit 82R while connecting head end conduit 82H to exhaust conduit EX. Energization of solenoid E reverses the connections to supply pressure to head end conduits 82H while connecting rod end conduit 82R to exhaust.

Operation of the hydraulic control circuit of FIGURE 6 is under the control of the electrical circuit of FIGURE 7 which controls the energization of solenoids B, C, D and E. The circuit of FIGURE 7 includes various contacts which may be operated manually or by limit switches engaged by carriage 24 at various positions of the carriage. Referring briefly to FIGURE 2, a pair of limit switches G1 and G2 are mounted at the opposite ends of track assembly 16, limit switch G2 being engaged by carriage 24 when the carriage is in its right hand limit of travel, while limit switch G1 is similarly engaged by the carriage when the carriage is at its opposite or left hand limit of travel.

To control the reversal of motor 82 during the full stroke of the carriage, limit switches F1 and F2 are disposed at a suitable location on opposite sides of the midpoint of travel of carriage 24 along track assembly 16.

Referring to FIGURE 5, a limit switch actuating plate 97 is hingedly mounted on motor 82 to contact the striker of limit switch F2 as the carriage approaches its midpoint of travel to the left as viewed in FIGURE 2. A second striker plate 98 of similar construction to plate 97 is likewise mounted on motor 82 to contact the striker of limit switch F1 as the carriage approaches its midpoint of movement from the left.

Limit switches F1 and F2 are offset from each other, as are their actuating plates 97 and 98. Each of plates 97 and 98 can swing in only one direction, hinging movement of the plate in the direction of actuation of its associated limit switch striker being prevented by an abutment 99 (FIG. 5) fixed on motor 82. Thus, as motor 82 moves to the left as viewed in FIGURE 5, plate 97 will strike and deflect the striker of limit switch F2, because abutment 99 prevents pivotal movement of plate 97 upon its hinge. During the return stroke of the carriage, motor 82 will approach the striker of limit switch F2 from the left as viewed in FIGURE 5, and plate 97 will swing freely about its hinge to permit plate 97 to ride over the striker on its return movement. A reverse arrangement is provided for the actuation of limit switch F1.

In addition to the limit switches described above, traversing control handle 48 controls six manually actuated contacts B1, B2 and B3 and C1, C2 and C3. Handle 48 is provided with two positions, one for each direction of travel of carriage 24 along track assembly 16. When handle 48 is positioned to drive the carriage from the right hand side of the cab to the left hand side of the cab, contacts C1, C2 and C3 are shifted from their normal condition indicated in FIGURE 7—i.e., positioning of handle 48 to drive carriage 24 from the right to the left hand side of the cab shifts contacts C1 and C2 from normal closed condition to an open condition while simultaneously shifting normally open contact C3 to its closed position. Positioning of handle 48 to drive the carriage to the left as described above has no effect on the condition of the contacts B1, B2 and B3, these contacts remaining in their normal condition as illustrated in FIGURE 7—i.e., contact B1 open and contacts B2 and B3 closed. To return the carriage from the left hand side of the cab to the right hand side of the cab, the operator shifts handle 48 to its other position, thus restoring contacts C1, C2 and C3 to their normal condition illustrated in FIGURE 7, while reversing the condition of contacts B1, B2 and B3.

In addition to the circuit elements referred to above, limit switches F1 and F2, each of which is provided with a normal open and a normal closed contact, are also provided with locking relays F1 and F2 of FIGURE 7 respectively. Closing of either normal open contacts F1a or F2a will energize the locking relays to hold the normal open contact F1a or F2a in its closed condition until the completion of the traversal of the carriage.

The contacts and solenoids are connected across a set of electrical supply lines L1 and L2, a main supply switch SS being connected in one of the lines to control energization of the entire circuit. Switch SS may be incorporated in the deadman control of the locomotive.

Assuming carriage 24 to be in the normal or right hand position illustrated in FIGURE 2, the striker of limit switch G2 is engaged by the carriage and its associated contacts G2a and G2b are reversed from their normal closed position to their open position. Traversing control handle 48 is then shifted by the operator to its leftward driving position, thereby opening contacts C1 and C2 and closing contact C3. This action energizes solenoid C from line L2 via contacts C3 and normally closed contacts B3 and G1b. Solenoid D is simultaneously energized from supply line L2 via closed contact C3 and normally closed contacts B3, B2 and F2b. It should be noted that it is not possible to energize either solenoids B or E at this time, the circuit to solenoid B being broken at contacts C1 and C2 (opened by the positioning of handle 48 in the drive left position) while the circuit to solenoid E is open at normal open contacts F1a and F2a.

As described above, energization of solenoids C and D position the respective reversing valves to connect the rod ends of both motors 50 and 82 to pressure conduit P while connecting the head ends of both motors to exhaust. This action causes the motors to drive in a direction retracting their respective piston rods, thereby driving carriage 24 to the left.

As carriage 24 approaches its midpoint in travel, plate 97 engages the striker of limit switch F2, thereby closing contacts F2a and simultaneously opening contacts F2b. Opening of contacts F2b opens the circuit to solenoid D and valve 82V shifts into its neutral position. When contacts F2a close, a circuit is completed through solenoids F1, E and F2 via normally closed contacts G1a, contacts F2a (closed by plate 97) normally closed contacts B2 and B3 and contacts C3 which are presently closed because of the position of handle 48. Energization of solenoid F2 locks contacts F2a in their closed position, while energization of solenoid E reverses valve 82V to connect the rod end of motor 82 to pressure conduit P and connect the head end of motor 82 to exhaust conduit EX. This set of connections to motor 82 causes the motor to drive in a direction extending its piston rod, this action being timed by appropriate chokes in the hydraulic lines, so that piston rod 86 begins to extend just after motor 82 crosses the midpoint of travel.

The foregoing connections are maintained until carriage 24 arrives at its extreme limit of travel to the left, the carriage then engaging limit switch G1 to depress the limit switch striker and open the normally closed contacts G1a and G1b of the switch. Opening of contact G1b by the arrival of carriage in its left hand limit of travel opens the circuit to solenoid C, thus permitting valve 50V to shift to its conduit blocking or neutral position. Opening of contacts G1a opens the circuits to solenoid E and holding solenoids F1 and F2. Opening of the circuit to solenoid E permits valve 82V to return to its neutral or blocking position, while the deenergization of solenoid F2 releases the electrical interlock on contacts F2a, permitting these contacts to return to their normal open position.

To return carriage 24 from its left hand position to its right hand position, the operator must shift traversing control handle 48 from its drive left to its opposite or drive right position. It will be noted that the arrival of the carriage at its left hand limit of travel has deenergized all of the solenoids and thus although traversing control handle 48 remains in its drive left position, opening of contacts G1a and G1b effectively prevent any further drive of the carriage to the left.

By shifting handle 48 to its drive right position, the operator restores contacts C1, C2 and C3 to their normal positions as illustrated in FIGURE 7, and simultaneously reverses the normal conditions of contacts B1, B2 and B3. Closing of contact B1 energizes solenoid B via normal closed contact C1, contact B1 and normal closed contact G2a which are closed at this time because the carriage is away from its right hand limit of travel, thereby permitting the contacts of limit switch G2 to assume their normal position. Solenoid D is likewise energized via contacts C1, B1, C2 and F1b. Solenoids E, F1, F2 and C are isolated at this time by normal open contacts F1a and F2a and by contacts B2 and B3 which are reversed by handle 48 to their open position.

Energization of solenoid B positions valve 50V to cause motor 50 to drive in a direction extending its piston rod while energization of solenoid D positions valve 82V to cause motor 82 to retract its piston rod. As the carriage approaches its midpoint, plate 98 engages the striker of limit switch F1, thereby closing contacts F1a and opening contacts F1b. Opening of contacts F1b deenergizes solenoid D thereby permitting reversing valve 82V to return to its neutral or blocking position, while closure of contacts F1a complete the circuit to solenoid E and to solenoids F1 and F2. Energization of solenoid F1 locks contact F1a in its closed position, while energization of solenoid E reverses the hydraulic connections to motor 82, thereby causing the motor to drive in a direction extending its piston rod throughout the remainder of rate with travel with carriage 24. When the carriage reaches its extreme right hand limit of travel, it engages limit switch G2 thereby opening contact G2a and G2b to deenergize solenoid B, solenoid E and holding solenoids F1 and F2. The deenergization of solenoids B and E return the valves of motors 50 and 82 to their neutral or blocking position.

Figure 8:
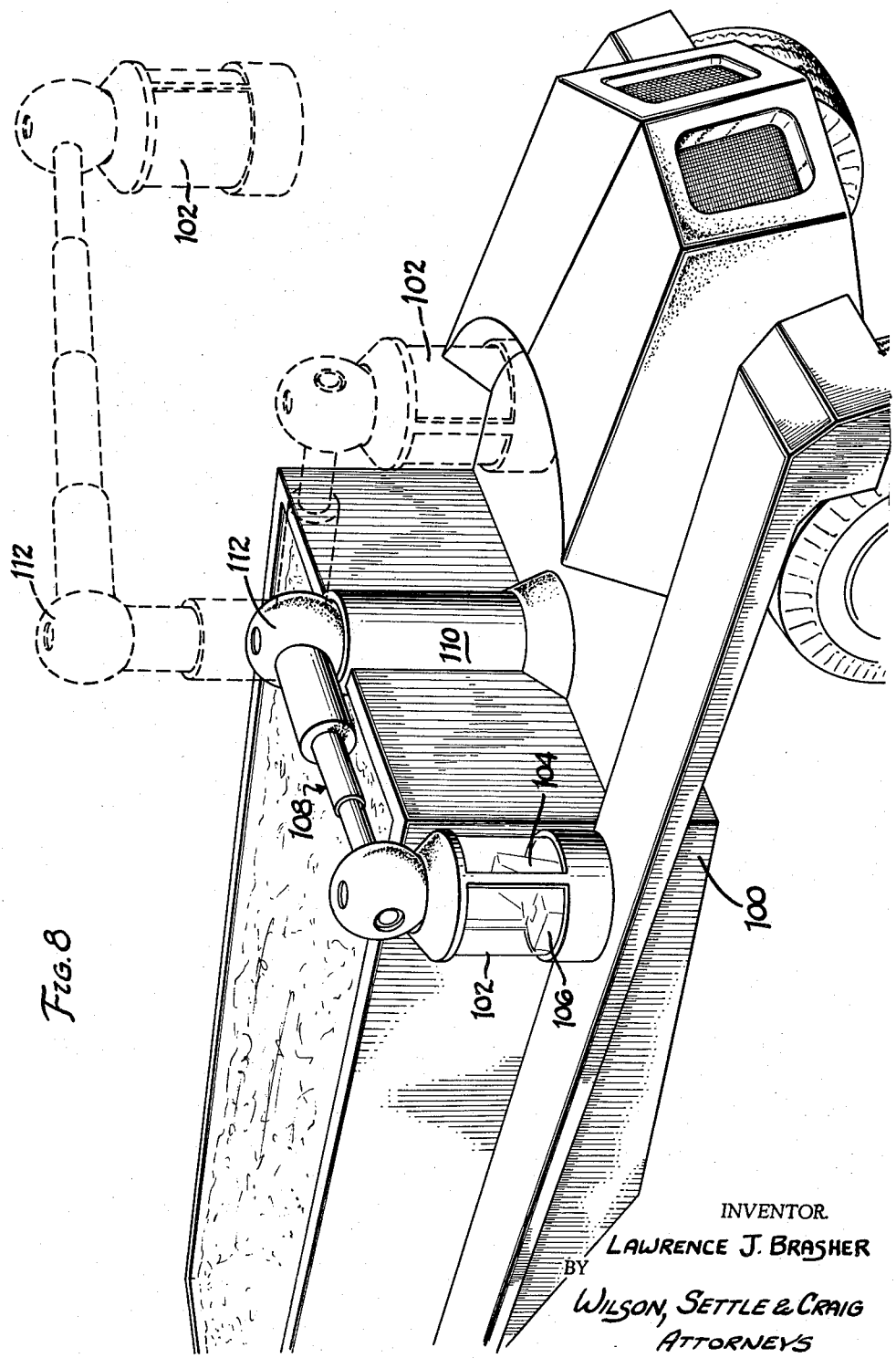
FIGURE 8 is a perspective view disclosing the invention in the environment of a heavy duty earth moving vehicle.

In FIGURE 8, another adaption of the invention has been generally illustrated. In the embodiment of FIGURE 8, a modified version of a control station is disclosed as being applied to a large earth moving vehicle designated generally 100. In this particular case, a capsule 102 is employed to support the combined operator's seat 104 and control console 106. The capsule in turn is supported at the outer end of an extensible arm assembly designated generally 108 which projects radially from a vertically extensible column assembly 110, mounted upon the vehicle frame. The upper end 112 of extensible arm 110 is mounted for rotation about a vertical axis which in this case is a stationary axis located centrally of the vehicle. Capsule 102 in turn is supported at the outer end of arm assembly 108 for rotation about a vertical axis at the end of arm assembly 108. Both of the arm assemblies 108 and 110 preferably are hydraulically operated, while the rotating mechanism for rotating arm 108 upon arm 110 and for rotating capsule 102 upon arm 108 preferably will take the form of an electrically driven gearing mechanism. As in the previous case, controls for both vehicle 100 and the extensible arm operating devices and rotating devices are mounted upon control console 106 so that the operator may locate the capsule at the desired position reporting the maximum visibility for the desired operation of vehicle 100.

While I have disclosed exemplary embodiments of my invention, it will be apparent to those skilled in the art that various modifications may be made. Therefore, the foregoing description is to be considered exemplary rather than limiting, and the true scope of the invention is that defined in the following claims.

I claim:
1. In a vehicle having a frame and vehicle operating means on said frame, a vehicle operator's control station comprising a first member mounted on the vehicle frame for movement transversely of said vehicle from one side of the vehicle to the other, first power means for driving said first member in movement on said frame, an operator's support platform mounted upon said first member for rotation relative to said first member about a vertical axis, second power means for driving said platform in selected increments of rotation on said first member, a control console mounted upon said platform for movement therewith, and control means on said console for controlling said vehicle operating means and said first and said second power means.

2. In a vehicle having a frame and vehicle operating means on said frame, a vehicle operator's control station comprising track means on the vehicle frame extending transversely of said vehicle from one side of the vehicle to the other, a carriage mounted on said track means for movement thereon, first power means for driving said carriage in movement on said track means, an operator's support platform mounted upon said carriage for rotation relative to said carriage about a vertical axis, second power means for driving said platform in selected increments of rotation on said carriage, a control console mounted upon said platform for movement therewith, and control means on said console for controlling said vehicle operating means and said first and said second power means.

3. In a vehicle having a frame and vehicle operating means on said frame, a vehicle operator's control station comprising a carriage mounted on the vehicle frame for movement transversely of said vehicle from one side of the vehicle to the other, a first hydraulic motor having a cylinder pivotally mounted at one end on said frame and an extensible piston rod projecting from the other end of said cylinder, a second hydraulic motor having a cylinder pivotally mounted at one end on said carriage and having an extensible piston rod projecting from the other end of its cylinder, means pivotally connecting the end of the piston rod of said second motor to said frame, and a rigid link pivotally connected at one end to the cylinder of said second motor and pivotally connected at its other end to the end of the piston rod of said first motor, motor actuating means operable to actuate said motors to drive said carriage from one side of said vehicle to the other, an operator's support platform mounted upon said carriage for rotation relative to said carriage about a vertical axis, power means for driving said platform in selected increments of rotation on said carriage, a control console mounted upon said platform for movement therewith, and control means on said console for controlling operation of the vehicle operating means, said motor actuating means and said power means.

4. In a vehicle having a frame and hydraulically controlled vehicle operating means on said frame; a vehicle operator's control station comprising a carriage mounted on said frame for movement transversely of the vehicle from one side of the vehicle to the other, first power means for driving said carriage in movement on said frame, an operator's support platform mounted upon said carriage for rotation relative to said carriage through an arc of 180° about a vertical axis between a forwardly facing position and rearwardly facing position, second power means for driving platform between said positions upon said carriage, a control console mounted upon said platform for movement therewith, control means on said console for controlling operation of said vehicle operating means and said first and said second power means, a series of hydraulic control conduits extending from said control means on said console to said vehicle operating means, each of said control conduits including a first flexible conduit section connected between the operating means and said carriage and adapted to accommodate movement of said carriage upon said frame, a first fitting on said carriage connected to said first conduit section, a second fitting on said platform, said first and said second fittings being radially spaced equidistant from the axis of rotation of said platform and angularly displaced 90° from each other about said axis when said platform is in either of its forwardly or rearwardly facing positions, a second flexible conduit section connected between said first fitting and said second fitting for flexing movement upon rotation of said platform between said positions, and means hydraulically connecting said fitting to the control means on said console.

5. A vehicle operator's control station as defined in claim 4 wherein said means hydraulically connecting said second fitting to said console comprises a housing mounted upon said carriage for coaxial rotation with said platform and for vertical movement relative to said carriage and said platform, said second fitting being mounted upon said housing, a third fitting mounted on said housing, a passage within said housing hydraulically connecting said second and third fittings to each other, and a third flexible conduit section connecting said control means to said third fitting, said third section being rotatable with said platform and capable of flexing movement to accommodate vertical motion of said housing relative to said platform.

6. In a railway locomotive having a cab and electrically and hydraulically controlled locomotive operating means; an operator's control station in said cab comprising a carriage, means supporting said carriage for movement across said cab from one side of said cab to the other, carriage traversing means operable to position said carriage at either side of said cab and to shift said carriage, an operator's support platform mounted on said carriage for rotation about a vertical axis on said carriage between a forwardly facing and a rearwardly facing position, power means operable to shift said platform between said positions, a control console mounted on said platform for movement therewith, control means on said console for controlling operation of said locomotive operating means, said carriage traversing means and said power means, and flexible electrical and hydraulic conduit means operatively coupling said control means to said operating means, traversing means and power means throughout the full range of movement of said console relative to said cab.

7. An operator's control station as defined in claim 6 further comprising a hollow cylindrical tube mounted upon said carriage coaxially of the axis of rotation of said platform, said electrical conduit means extending from the locomotive operating means to said console via the interior of said tube, a housing supported on the exterior of said tube for vertical sliding movement thereon and coupled to said platform for rotation therewith, a series of flexible hydraulic conduit means each coupled between a first fitting on said carriage and a second fitting on said housing, the respective first and second fittings being displaced 90° from each other about the axis of rotation of said platform when said platform is in its forwardly or rearwardly facing positions, a flexible conduit section hydraulically connecting each first fitting to the operating means controlled thereby and a second flexible hydraulic conduit hydraulically connecting each second fitting to the appropriate control means on said console.

8. In a vehicle having a frame and vehicle operating means on said frame; a vehicle operator's control station comprising a carriage having vehicle control means thereon for controlling said vehicle operating means, means supporting said carriage for movement on said frame transversely of said vehicle between a normal position at one side of said vehicle and a second position at the opposite side of said vehicle, a first extensible link including hydraulic power cylinder having an extensible piston rod projecting from one end, means pivotally connecting one end of said first extensible link to said carriage and pivotally connecting the other end of said first extensible link to said frame at a location midway between the opposite sides of said vehicle, pressure supply means including a first reversing valve connected to said first link operable to extend or retract said link traversing control means on said carriage operable when said carriage is at either of said normal or said second positions for operating said first reversing valve to retract said first link to thereby drive said carriage toward the center of said vehicle, and means responsive to the approach of said carriage to the center of said vehicle for automatically shifting said reversing valve to cause said first link to extend after said carriage has crossed the center of said vehicle to thereby drive said carriage away from the center of the vehicle toward the side opposite that at which said carriage was last located.

9. Apparatus as defined in claim 8 further comprising a second extensible link including a hydraulic power cylinder having an extensible piston rod projecting from one end, means pivotally mounting one end of said second link on said frame adjacent one side of said vehicle, a rigid link pivoted at one end to the other end of said second link and pivotally connected at its other end to the cylinder of said first link, said second link extending generally transversely of said vehicle and being fully extended when said carriage is in one of said positions and fully retracted when said carriage is in the other of said positions, second reversing valve means operatively connected to said pressure source and said second link operable to extend or retract said second link, and means connecting said second reversing valve to said traversing control means for operation by said traversing control means.

10. Apparatus as defined in claim 9 further comprising end limit means responsive to the arrival of said carriage at either of said normal or second position for hydraulically locking both of said extensible links, said traversing control means being operable when said carriage is at either of said positions to operate said reversing valves only to drive said carriage toward the other of said positions of said carriage.

References Cited by the Examiner
UNITED STATES PATENTS

| | | | |
|---|---|---|---|
| 2,607,432 | 8/52 | Lommel | 180—77 |
| 2,670,987 | 3/54 | Walsh | 297—344 |
| 2,758,872 | 8/56 | Solomon et al. | 297—344 |
| 2,858,877 | 11/58 | Krause | 297—344 |
| 3,063,173 | 11/62 | Wardle | 180—77 |
| 3,088,537 | 5/63 | LeTourneau | 180—77 |

MILTON BUCHLER, *Primary Examiner.*

LEO QUACKENBUSH, *Examiner.*